Patented July 20, 1948

2,445,431

UNITED STATES PATENT OFFICE 2,445,431

SOLDERING WITH RESIN FLUXES

Lawrence R. Hill, Pittsburgh 21, Pa., assignor to Westinghouse Electric Corporation, East Pittsburgh, Pa., a corporation of Pennsylvania No Drawing. Application August 26, 1943, Serial No. 500,163

3 Claims. (Cl. 29—148)

This invention relates to soldering fluxes, more particularly fluxes capable of being treated to leave no corrosive residue.

In soldering the members, it is customarily required to apply to the portions of the member being soldered a corrosive fluxing agent for the purpose of cleaning impurities and oxides from the metal surface being soldered and to etch the metal to provide for an adequate bond between the solder and the portion being soldered. However, upon completion of the soldering the presence of the corrosive flux is thereafter undesirable for various reasons. Rusting or other corrosion of the metal surface takes place at an accelerated rate. In the case of electrical apparatus, the corrosive flux residue may cause failure of the insulation adjacent thereto, thereby impairing the operation of the apparatus.

Fluxes for soldering which do not have a powerful corrosive action by reason of a relatively low acidity have been found to be unsatisfactory, since they fail to remove adequately impurities and surface oxides on the metal and fail to etch the metal sufficiently to provide for a good solder bond. Therefore, the problem of effecting a good soldering job calls for the use of a highly acidic flux having strong corrosive characteristics, whereas for subsequent purposes the presence of such acidic material is undesirable.

According to this invention, partially reacted resins having a high acid number are applied to members to provide for a satisfactory soldering flux. After soldering, the member with the applied resin flux is subjected to suitable heat treatment, the partially reacted resin being caused to react more completely, thereby reducing the acid number to a value where the corrosive properties are insignificant and the resin in some cases may function as an electrical insulation.

The object of this invention is to provide for applying to members a soldering flux composed of a high acid number partially reacted resin composed of an organic polybasic acid and a polyhydric alcohol, the resin being capable of further subsequent reaction to produce a low acid number substantially non-corrosive resinous product.

A further object of the invention is to provide for treating members with a partially reacted high acid number resin to provide for a sufficiently corrosive fluxing action to promote good soldering and, after soldering, heat treating the member to react further the resin to produce an insulating deposit.

Other objects of the invention will in part be obvious and will in part appear hereinafter.

In producing a sufficiently corrosive soldering flux, it has been found that polybasic organic acids and polyhydric alcohols in substantially molar equivalents may be partially reacted to cause an initial resinification, the product having a high acid number in this state. For the practice of the invention, polybasic organic acids, such, for example, as maleic acid, phthalic acid, fumaric acid, succinic acid, adipic acid, citric acid, 1,8-naphthalic acid, tetrahydro-naphthalic acid and similar organic acids may be employed. Suitable polyhydric alcohols for the practice of the invention are, for example, glycerol, ethylene glycol, propylene glycol, mannitol, polyethylene glycol and pentaerythritol. The polyhydric alcohol and polybasic acid are preferably reacted in substantially molar equivalents to provide for eventual complete neutralization of the carboxyl groups of the polybasic acid.

The polybasic acid and polyhydric alcohol can be partially reacted by simply combining substantially molar equivalents of the ingredients in a receptacle and applying sufficient heat to cause melting to occur. As soon as the alcohol and acid have melted, reaction takes place with a partial resinification. The acid and alcohol can be reacted in an inert atmosphere and under conditions customarily employed in resin manufacture.

The acid number of the reaction product will be found to be high initially, for example, an acid number of 250 or more may be present at this stage. As heating is prolonged, the acid number will tend to decrease indicating a more complete reaction resulting in a lower proportion of active acid groups.

The partial reaction product produced by heating the acid and polyhydric alcohol for less than one hour, for instance, is ordinarily an oily liquid or syrupy mass. If heating is prolonged, further resinification will produce a product which is increasingly viscous and has a relatively low acid number. Such product is essentially solid at room temperature. For the purpose of the invention, the heating should be discontinued after several minutes, generally not exceeding an hour for the reaction, depending on the temperature. At low temperatures, the reaction may be carried out for a relatively long period of time. The reaction should only be carried out to cause partial resinification and the product should have a high acid value.

In order to provide for satisfactory fluxing, the reaction product of the polybasic acid and polyhydric alcohol should have an acid number of over 100. For best results, an acid number of about 250 is indicative of a highly corrosive flux which may be employed with success for soldering purposes. A resin of an acid number of about 250 is as effective as ammonium chloride, zinc chloride or other conventional fluxes of high corrosive power.

As an example of the practice of the invention, 61 parts by weight of glycerol were reacted with 98 parts by weight of maleic anhydride in a kettle by applying sufficient heat to melt the mixture. A temperature of around 200° C. was applied to the ingredients for several minutes. An acid number of approximately 250 was obtained in the partially reacted product. At room temperature, the product was oily in appearance and could be readily applied by brushing to predetermined portions of surfaces to be soldered.

In another case, one mol of diethylene glycol and one mol of maleic anhydride were reacted by heating them in a vessel to a temperature of 170° C. for ½ hour. The product had a high acid number and was an oily liquid suitable for application as a soldering flux.

In another instance, a particular effective flux was prepared from one mol of phthalic anhydride, one mol of maleic anhydride and one mol of pentaerythritol placed in a vessel and heated at a temperature of 140° C. for ½ hour. The product was a syrupy liquid. It could be easily brushed upon surfaces to be soldered. The liquid reaction product had an acid number of over 230.

The partially reacted polyhydric alcohol and organic acid when applied to members being soldered is sufficiently acid to remove any surface metallic oxides and other impurities and to etch the metal to provide for a good solder bond. After soldering has been accomplished, the flux may be removed by wiping and washing with a solvent if desired. This, however, is not necessary if the member is subsequently subjected to heat treatment at temperatures of the order of 200° C. By prolonged heat treatment at these temperatures, the partially reacted resin is caused to react further to produce a solid resinous product of relatively low acid number. For example, several hours at 200° C. will cause the glycerol-maleic anhydride flux to react more completely to a resin with an acid number of less than 50, at which point it is substantially non-corrosive.

In particular, in the preparation of electrical apparatus such as motors, generators, switchgear and the like where soldering of copper conductors and the like is required, the flux of the present invention may be used to great advantage. The partially reacted resin may be applied to the conductors being soldered where its high acid number will provide for good soldering. Since it is customary to impregnate motor windings and the like with varnishes and thereafter bake the impregnated windings for several hours, the soldering flux may be left on the soldered joint, since during the baking operation the resinous soldering flux will be further reacted to reduce the acid number to less than 50, whereupon its corrosive properties will be substantially depleted. In fact, the resin produced is characterized by highly insulative properties and will assist in providing for improved electrical insulation after the baking treatment of the apparatus.

In case the partial reaction of the organic acid and alcohol has been carried out to the extent that the product is exceedingly viscous or even partially solidified, but still having a high acid number, the resin may be dissolved in a solvent and applied in solution to the portions of the member being soldered. The solvent will evaporate prior to or during soldering, leaving a deposit of the corrosive flux at the place required.

Since certain changes in carrying out the above process and the composition described herein may be made without departing from the scope of the invention, it is intended that all matter contained in the above description shall be interpreted as illustrative and not in a limitative sense.

I claim as my invention:

1. The process comprising applying to a member as a soldering flux a resin derived by partially reacting an organic dibasic acid and a polyhydric alcohol to a resin of an acid number of over 100, soldering the member with the resin functioning as a flux, and heat treating the soldered member and applied resin to react further the dibasic acid and polyhydric alcohol to an acid number of less than 50 to render the resin remaining on the member substantially non-corrosive.

2. In the process of soldering a member, the steps of applying to the member the product derived by partially reacting substantially molar equivalents of pentaerythritol and a polybasic organic acid to an acid number of over 100, soldering the member with the reaction product functioning as a flux, and heat treating the soldered member and applied reaction product at temperatures above 100° C. for a period of time sufficient to react further the pentaerythritol and organic acid to leave on the member a relatively non-corrosive resin of an acid number of less than 50.

3. In the process of soldering an electrical member, the step of applying to predetermined portions of the electrical member the partial reaction product of substantially molar equivalents of an organic polybasic acid and a polyhydric alcohol, the product having an acid number of over 100, soldering at the predetermined portions of the electrical member, and heat treating the soldered electrical member to react further the organic polybasic acid and polyhydric alcohol into a relatively non-corroive resin of an acid number of less than 50, the resin providing for electrical insulation at the predetermined areas.

LAWRENCE R. HILL.

REFERENCES CITED

The following references are of record in the file of this patent:

UNITED STATES PATENTS

| Number | Name | Date |
|---|---|---|
| 1,667,197 | Downs et al. | Apr. 24, 1928 |
| 1,772,743 | Barringer | Aug. 12, 1930 |
| 1,785,173 | Barrett | Dec. 16, 1930 |
| 1,847,783 | Pieper | Mar. 1, 1932 |
| 1,859,651 | Bowers | May 24, 1932 |
| 1,929,895 | McBride | Oct. 10, 1933 |
| 2,085,778 | Winkelmann | July 16, 1937 |
| 2,095,335 | Kofke | Oct. 12, 1937 |
| 2,250,940 | Zahn et al. | July 29, 1941 |
| 2,317,811 | Scheiber | Apr. 27, 1943 |
| 2,342,357 | Miller | Feb. 22, 1944 |
| 2,383,589 | Bunting et al. | Aug. 28, 1945 |

FOREIGN PATENTS

| Number | Country | Date |
|---|---|---|
| 337,682 | Great Britain | Nov. 6, 1930 |
| 494,906 | Great Britain | Nov. 3, 1938 |

OTHER REFERENCES

The Metal Industry (London), April 30, 1937, pages 503–505.